US005095320A

United States Patent [19]

Rose

[11] Patent Number: 5,095,320
[45] Date of Patent: Mar. 10, 1992

[54] FOCUSING MECHANISM FOR LINESCAN IMAGING

[75] Inventor: David M. Rose, San Diego, Calif.

[73] Assignee: Anacomp, Inc., San Diego, Calif.

[21] Appl. No.: 576,686

[22] Filed: Aug. 30, 1990

Related U.S. Application Data

[63] Continuation of Ser. No. 387,950, Jul. 31, 1989, Pat. No. 4,975,714.

[51] Int. Cl.[5] .............................................. H04N 1/21
[52] U.S. Cl. ................................................. 346/108
[58] Field of Search ....................... 346/107, 108, 160

[56] References Cited

U.S. PATENT DOCUMENTS

| 4,003,061 | 1/1977 | LaCranfora | 346/108 |
| 4,354,196 | 10/1982 | Neumann et al. | 346/108 |
| 4,686,541 | 8/1987 | Rosier | 346/108 |
| 4,796,038 | 1/1989 | Allen et al. | 346/108 |

Primary Examiner—Mark J. Reinhart
Attorney, Agent, or Firm—Dressler, Goldsmith, Shore, Sutker & Milnamow, Ltd.

[57] ABSTRACT

A continuous motion imaging system having a focusing mechanism for linescan imaging. Carriage apparatus connected to a continuous motion device moves a platen which holds the imaging media. A flexure connection between the carriage and the platen, coupled with a precise rail and bearing structure, provides for precision focus at the linescan position over the axis between the bearings.

35 Claims, 3 Drawing Sheets

FOCUSING MECHANISM FOR LINESCAN IMAGING

This is a continuation of application Ser. No. 07/387,950, filed on July 31, 1989, now U.S. Pat. No. 4,975,714.

FIELD OF THE INVENTION

This invention relates generally to raster imaging systems and more particularly to a focusing mechanism for continuous motion linescan images.

BACKGROUND OF THE INVENTION

Raster imaging systems are common and their use is well documented for many purposes including television and other cathode ray tube screen use and microfilm and microfiche imaging. It is typical for known raster imaging systems to employ full frame exposure and therefore full frame focusing optics. This requires that the entire frame, which may be as large as 4" by 6", be within tolerance at the focal plane of the scanning system, which is difficult. Then there must be some means for transporting the media to the next full frame exposure. This can waste time in accelerating the media, transporting the media without imaging, decelerating the media and waiting for it to settle before commencing the next frame exposure.

The precision of motion and focus is particularly important to the computer output microfilm (COM) industry. In making microfiche and related types of images it is conventional to hold the media, typically a film, while scanning in two directions. That is what is normally understood by the term "raster scanning."

Linescan imaging systems use an imaging beam or beams which are modulated with the desired data and scanned across a media while the media is moved with a constant velocity perpendicular to the beam sweep. This provides a two dimensional image. Presently, constant velocity transports for moving discrete media, such as sheets of film or paper, silicon wafers, printer's plates, among others, must not only provide the constant velocity, but also must hold the entire media in the focal plane to be read for imaging.

Other systems which employ a continuous media require elaborate apparatus to hold the media precisely at the focal plane while the media is moving. One example of such a structure is an air or gas bearing to position film away from the aperture as described in U.S. Pat. No. 4,168,506. This technique no only has the drawback of requiring precision orifices, well regulated and filtered gas, and other precision aspects, but is not applicable to discrete media.

When it is necessary to start and stop the recording media between full frame exposures, as in the prior art, there is overhead time or lost time in the exposure-to-exposure moves during which no exposure can be accomplished. Further, by requiring scan motion in two directions and media motion in order to expose subsequent frames, there is substantial complexity and cost involved in such an imaging system. Because the aperture is a full frame opening in the prior art system, it is difficult to prevent fogging from stray scattered energy. Also in the previous systems it was generally impossible to have negative imaging due to image blooming from stray scattered energy because of the size of the full frame opening caused by the same problem related to fogging as mentioned above. Because the two dimensional motion was previously required for full frame imaging, it was not possible to use a relatively simple linear motion to accomplish the scanning necessary.

SUMMARY OF THE INVENTION

Broadly speaking, this invention greatly simplifies imaging for the computer output microfilm industry and for related purposes by employing continuous motion and linescan imaging. The invention provides a reference surface at the focal point of a linescan imaging system which also includes a constant velocity transport which holds the photosensitive media in the image plane independently of the motions of the transport or the other areas of the media. A significant advantage of this invention is that the constant velocity transport need only constrain the media in two axes instead of three and the entire media need not be constrained in the focal plane.

This invention provides structure which overcomes the prior problem of separating the transport function from the focusing function for both discrete and continuous media. This has the distinct advantage of substantially reducing complexity and associated costs as well as improving reliability of the transport system. One aspect of the invention is that it creates images on a photosensitive media in a manner that provides one axis of scan by continuously moving the media. This enables the use of a slit aperture for one directional energy scan instead of needing a full aperture as has been required previously. This reduces unwanted background energy and makes possible negative imaging, sometimes referred to as "inverse video."

The structure of the invention employs a one-directional energy scanning image means in conjunction with a means to move the energy sensitive media at a precisely controlled velocity at a right angle to the energy scan, thereby providing the other scan axis. This movement can be provided by servo-controlled linear stage using a lead screw, or by a rotary drum, for example. The system of this invention employs some structure which is typical in the microfilm imaging industry, including a laser light source which is modulated with the desired data, scanned by means of a holographic disc and imaged onto continuously transported film. The structure also includes mechanical means for providing focus of the modulated information beam on the media at the slit aperture. This is accomplished by providing a pair of bearing points which describe a line parallel to and directly over the linescan and a technique for suspending the mechanism freely on the bearing points at all points of the transport travel while rigidly imparting the constant velocity by means of a two-degree-of-freedom flexure arrangement. Another aspect of the invention is that the mechanism provides for utilizing a continuous feed media without interfering with the bearing points and does this by providing an offset between the focal point and the bearing surfaces to allow a passthrough for the media. The mechanism can be held in contact with the bearings by various forces, such as gravity, springs and magnetism, among others.

BRIEF DESCRIPTION OF THE DRAWING

The objects, advantages and features of the invention will be more clearly perceived from the following detailed description, when read in conjunction with the accompanying drawing, in which.

DESCRIPTION OF THE PREFERRED EMBODIMENTS

Figure 1:
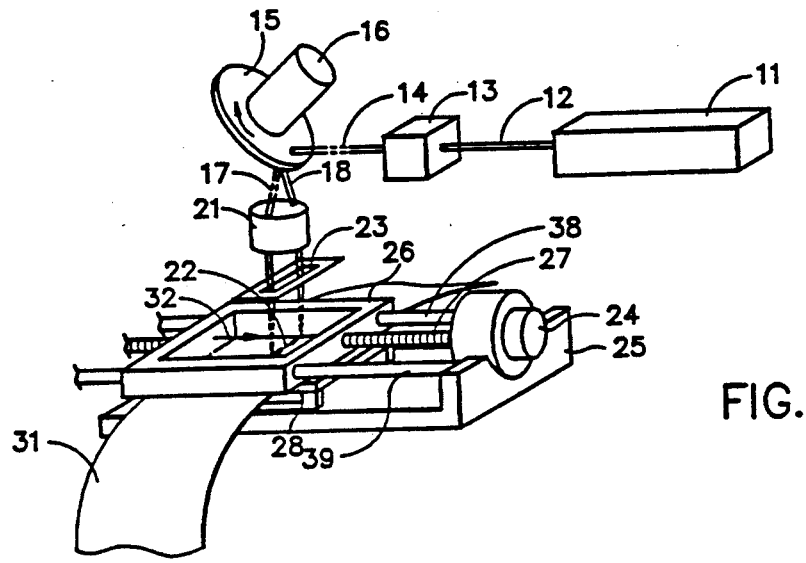
FIG. 1 is a schematic representation of the energy scanning imaging means of the invention.

With reference now to the drawing, and more particularly to FIG. 1 thereof, there is shown laser 11 which emits light beam 12 which passes through and is modulated with data by means of modulator 13. Modulated beam 14 then impinges upon holographic scan disc 15 driven by motor 16. The holographic scan disc causes the modulated beam to move between beam extremes 17 and 18 where it is focused by imaging optics 21 onto a linescan 22 at a focal plane through slit aperture 23. Servo-motor 24 is mounted on frame 25 and drives carriage 26 through lead screw 27. Photographic media or film 31 is retained at a predetermined location in platen 28 which is moved by means of a connection with the carriage. The structure of the platen and its bearing assembly assures that the film is in perfect position at linescan 22 to receive the focused data beam. Arrow 32 indicates the direction of motion of carriage 26 which moves on rods or rails 38 and 39.

The laser scan structure provides essentially one-directional energy scanning imaging means which operates in conjunction with means to move the energy sensitive media, or film, at a precisely controlled velocity at a right angle to the energy scan direction indicated by linear 22, thereby providing the two scan axes. Movement of the platen, carriage and media is shown as being provided by a servo-controlled linear stage but it could be provided by a rotary drum, for example.

A major aspect of the invention concerns the fact that the focal plane of such a linescan imaging system need only be a focal line, that being indicated by reference numeral 22. This eliminates the need to hold the media in focus anywhere except in a line adjacent the aperture and only for the instant the area of the media to be imaged travels past that point. For microfilm imaged at 48 times reduction and at high resolution (e.g., 240×240 dots per inch full size), the imaging dot diameter is 3 microns, requiring a maximum depth of field of 12 microns.

Figure 2:
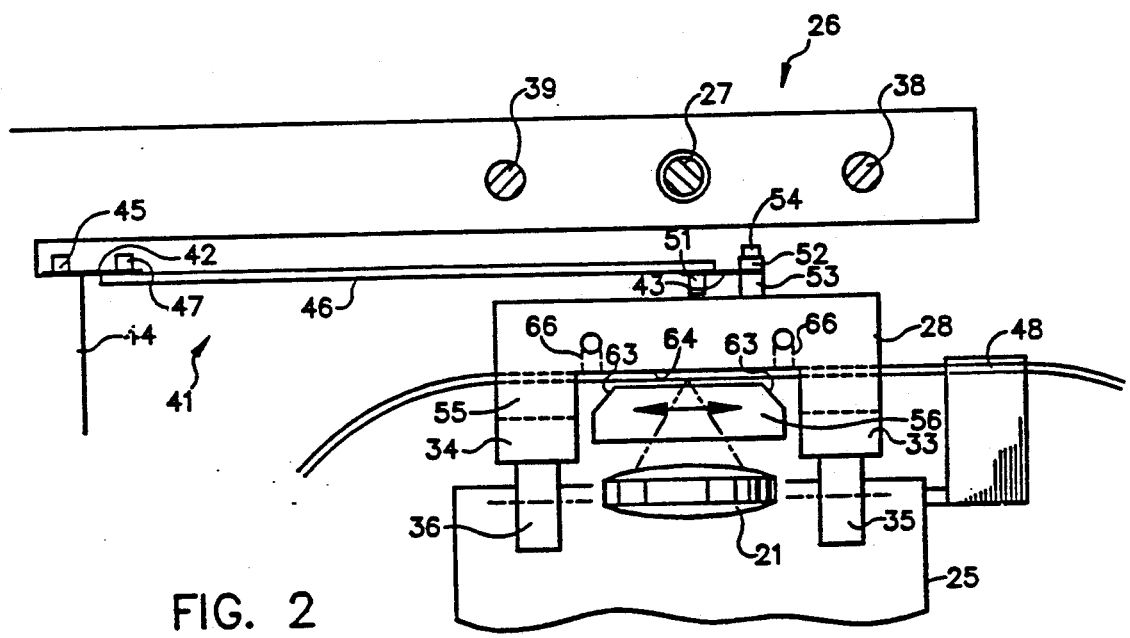
FIG. 2 is a schematic, partial end view of the carriage and platen employed in moving the media in the FIG. 1 embodiment.
Figure 3:
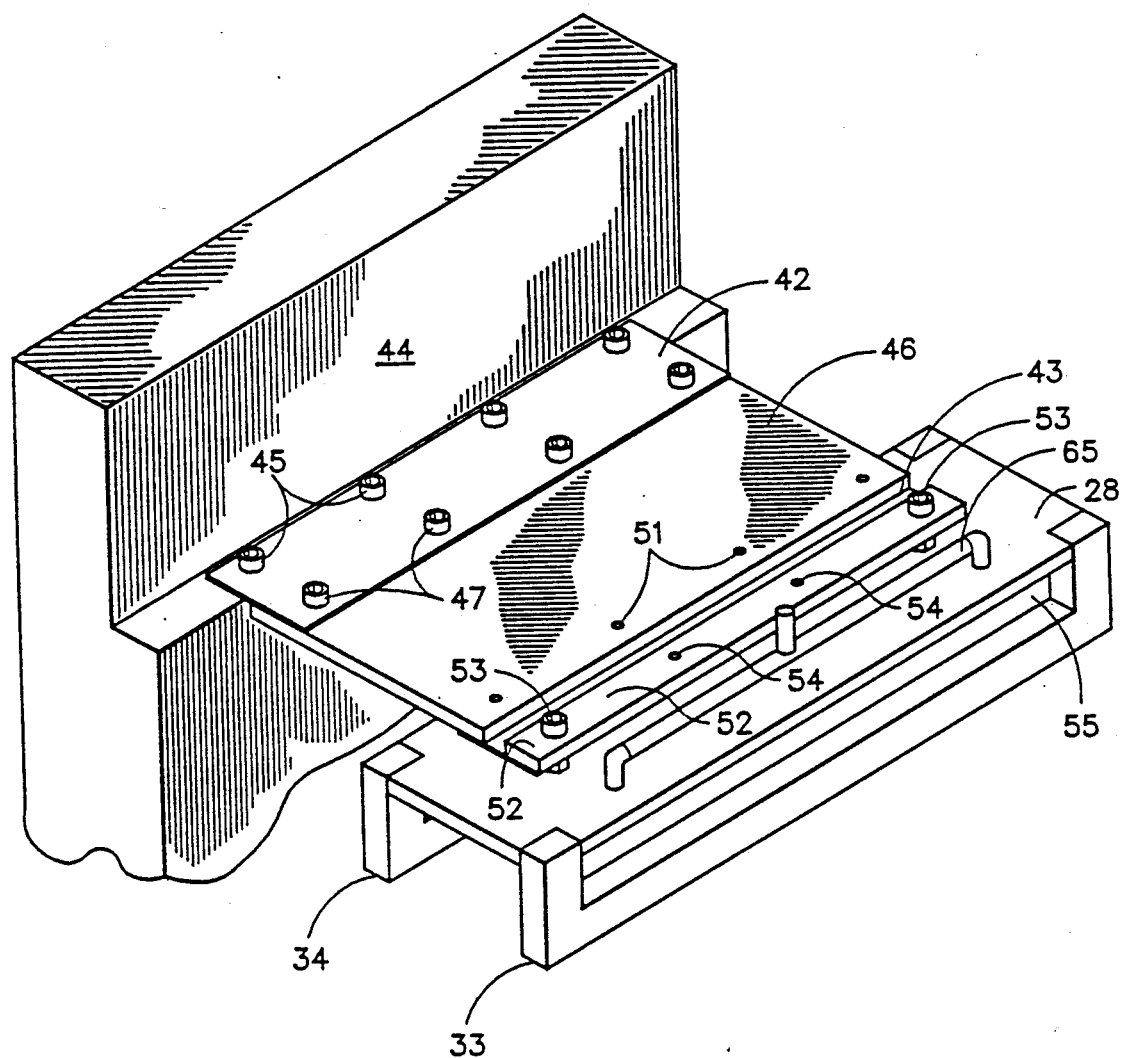
FIG. 3 is a perspective view of the platen and a portion of the carriage of FIG. 2 showing the two-element flexure arrangement.
Figure 4:
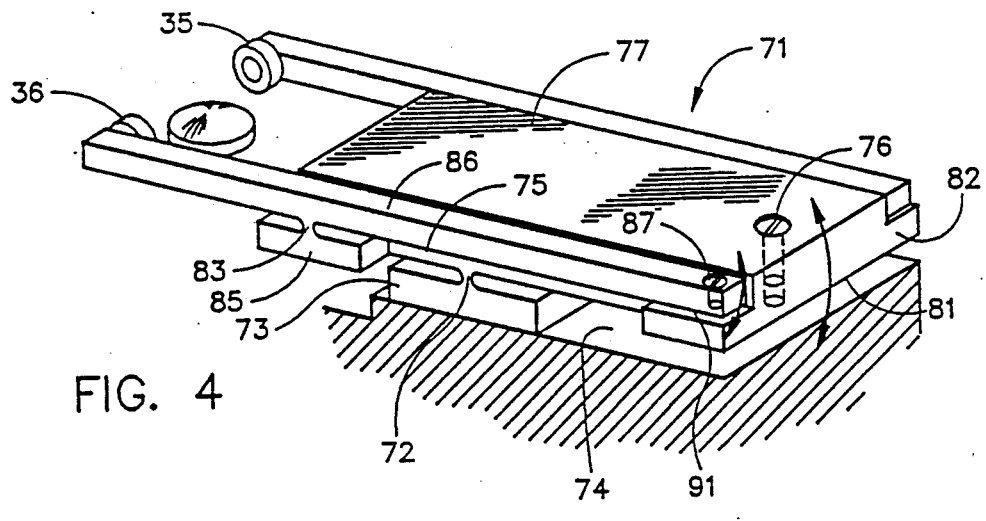
FIG. 4 is a perspective view showing the carriage bearing adjuster of the invention.

The film is held within this depth of field by providing a pair of bearing points which describe a line parallel to and directly over or aligned with the linescan 22 and is depicted in FIGS. 2 and 4. Platen 28 is formed with bottom rails 33 and 34 which have a bottom bearing surface flat to within 2.5 microns. These rails ride on ball bearings 35 and 36 respectively, thereby defining between the rails and bearings a precise line position. The means for providing linear motion to the platen into and out of the plane of the paper as shown in FIG. 2 is by means such as lead screw 27 movably connected to a carriage 26 and rotatably mounted to frame 25 through motor 24. Rails 38 and 39 are fixed to the frame. This transport means is connected to platen 28 by means of flexure connection 41 having two elongated flexure joints 42 and 43. This flexure connection is more clearly depicted in FIG. 3, in addition to the schematic representation of FIG. 2. Elongated foil joint 42 is rigidly mounted to element 44 of the carriage 26 by means of fasteners such as bolts or rivets 45. Rigid plate 46 is mounted to the opposite side of foil joint 42 by fasteners 47 and to foil joint 43 by fasteners 51. Bar 52 is secured to the top of platen 28 by appropriate bolt/pin connectors 53 and foil joint 43 is rigidly connected thereto by means of fasteners 54. This is the preferred embodiment of the flexure connection but other flexural systems could provide the flexure necessary. That is, there could be more than two flexured joints, or even one such joint could do the job under certain circumstances. The foil joint is contemplated as being thin metal foil having sufficient shear strength to provide the rigid planar motion desired while still flexing as intended. Other materials could accomplish the same purpose.

With this structure, carriage 26 rigidly imparts the constant velocity of the lead screw or equivalent means to platen 28. Thus the linear motion connection between the carriage and the platen is rigid while the connection between the carriage and the platen is flexible in the direction normal to the carriage movement, that is, up and down, as seen in the drawing figures. While the position of the platen, as governed by bearings 35 and 36 and rails 33 and 34, is precise, there is considerably less precision in the motion of carriage 26 along rails 38 and 39 as governed in movement by lead screw 27. The flexure connection allows for these lower tolerance elements and transport means, and transfers that less than precise vertical transport motion to extremely precise positioning of the platen by means of the bearings and rails through the flexure connection.

A conventional film transport may include stepper motor and drive apparatus 48 which moves continuous feed film 31 through slot 55 in the platen 28. The stepper motor is shown in FIG. 2 mounted to frame 25. It may be mounted at any convenient location. To assist vacuum clamping, slot 55 is considerably narrowed by guides 56 and 57 mounted on top of platforms 61 and 62 (shown in FIG. 5). Each guide has side chamfers 63 to facilitate lead-in of the film. In operation, after the entire frame has been exposed, the carriage recycles to the starting position and the film moves forward one frame length. Surface 64 on the underside of platen 28 above rails 33, 34 is flat to within 2.5 microns and the film is secured thereto by appropriate means such as a vacuum. As shown in FIG. 3, vacuum hose 65 is connected to the platen 28 and, through interior passageways (not shown), is connected to slots 66 which clamp the film 31 flush on underside 64 of platen 28. When it is time to move the film after a frame has been exposed, the vacuum in hose 65 is released so that film 31 is released from platen surface 64 and the film can then be moved through the platen by one frame width distance. At that time, vacuum again is applied through hose 65 and the film is held positively against platen surface 64. There are other means by which a media may be secured to the platen surface, such as gravity, electrostatic forces, and others. Slots 55 between rails 33 and 34 and platen surface 64 comprise what is termed a "passthrough" for the film so that it does not interfere with the bearing points between the rails and the ball bearings. The film is maintained close to the platen by guide 56.

Another aspect of the invention is shown in FIG. 4 which provides for the precise adjustment for linescan focus between the rail 33,34 and the ball bearings 35,36. The platform 71 provides two axes of adjustment for precise positioning of ball bearings 35 and 36. Flexure point 72 provides adjustment for both ball bearings simultaneously in the vertical direction. Base 73 is connected to pedestal 74 of the imaging machine. Top plate 75 is secured to the underside of platform 77. Adjusting screw 76 is mounted in platform 77 and abuts upper surface 81 of pedestal 74. As screw 76 is turned in one direction, it bears against surface 81 causing end 82 of the platform 77 to raise, thereby lowering the ball bearings 35,36, when the entire structure is pivoted about flexure point 72. Turning screw 6 in the opposite direction causes the ball bearings to be raised in the vertical direction.

For the precise alignment of bearings 35 and 36, flexure point 83 is provided by which ball bearing 36 may be raised or lowered independently of bearing 35. Base 84 is secured to platform 77 and bar 86 provides the upper portion of flexure point 83. At one end of bar 86 is rotatably mounted bearing 36 and at the other end is mounted adjusting screw 87. Screw 87 has a lower extremity which bears against surface 91 on platform 77 so that when this screw is raised or lowered, it will affect the vertical position of bearing 36 in a manner similar to that previously described for both bearings. Rails 33 and 34 of platen 28 ride on bearings 35 and 36 as previously described.

When setting up the apparatus, appropriate instruments would be used to determine the precise alignment of bearings 35 and 36 with respect to the optical portion of the system. This is adjusted by means of bar 86 and screw 87. When this alignment is achieved, the final vertical adjustments of the bearings are made by screw 76 to achieve precise focus in a line parallel to the axis between the bearings and on the surface of film 31.

Figure 5:
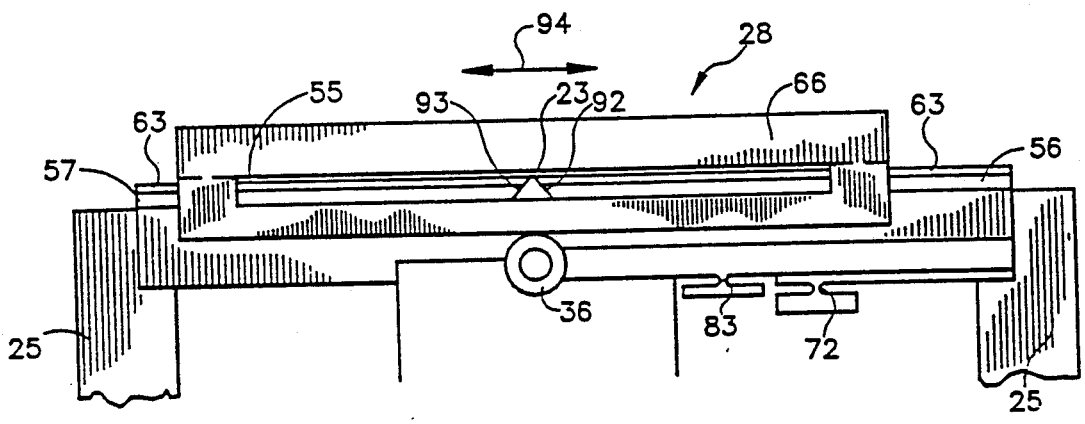
FIG. 5 is a side view of the carriage bearing adjuster and platen.

The side view of FIG. 5 shows platen 28 in position above the guides and platform 77 and on the bearings. Guides 56 and 57 have chamfered ends 92 and 93 which have knife edges. When these guides are placed close together as shown in FIG. 5, they form slit aperture 23 previously discussed. The film resides in slot 55 above guides 56 and 57. Arrow 94 shows the direction of movement of platen 28 as moved by carriage 26 pursuant to the motion of lead screw 27. During exposure, that is, during sweeps of energy by the apparatus shown in FIG. 1, the platen moves steadily and continuously in one direction. At the end of the frame exposure, the film is moved through slot 55 and the platen is snapped back to its home position. Then the film is returned to contact with the underside of the platen and carriage and the platen once again moves steadily during exposure.

In view of the above description, it is likely that modifications and improvements will occur to those skilled in the art which are within the scope of the accompanying claims.

What is claimed is:

1. A focusing mechanism for a linescan imaging apparatus that records data on an imaging media as such media is moved in a first direction while being maintained in focus in a second direction, the mechanism comprising:
   a frame;
   means for generating a signal beam representing data to be recorded on said imaging media;
   means for scanning said signal beam across said media in a focal line that is positionally fixed relative to the frame;
   platen means for holding said media;
   carriage means moveable in the first direction with respect to said focal line;
   means for coupling said platen means to said carriage means flexibly in the first direction and flexibly in the second direction so that movement of said carriage means in said first direction is inflexibly coupled so as to also move said platen means and said media in said first direction while simultaneously permitting said platen means and said held media flexibility to move in the second direction with respect to the focal line;
   drive means coupled between said frame and said carriage means for moving said carriage means in the first direction during scanning of said held media; and
   guide means, operative between the frame and the platen means, for positioning said platen means and said held media in the second direction in order to maintain said media in focus with said scanning signal beam at said focal line.

2. The focusing mechanism recited in claim 1, wherein said guide means for positioning said platen means in order to maintain said media in focus comprises:
   spaced rails on said platen means having flat bearing surfaces; and
   similarly spaced bearings positioned on the frame, said rails riding on said bearings.

3. The focusing mechanism recited in claim 2, wherein there are two said spaced bearings.

4. The focusing mechanism recited in claim 1, and further comprising a slit aperture positioned between said signal beam generating means and said imaging media.

5. The focusing mechanism recited in claim 1 wherein said platen means further comprises:
   a platen surface; and
   means for selectively holding said imaging media to said platen surface, and for selectively releasing said media from said platen surface.

6. The focusing mechanism recited in claim 1 further comprising:
   feed means operative relative to said frame for periodically feeding said media by a predetermined amount into its held position on said platen means.

7. The focusing mechanism recited in claim 1 wherein said drive means for providing motion to said carriage means includes:
   reciprocating drive means for providing reciprocating motion to said carriage means in the first direction.

8. The focusing mechanism recited in claim 1, wherein said means for coupling said platen means to said carriage means includes:
   a connection rigid in one plane and flexible in a direction normal to this plane, said connection comprising:
      a first rigid member connected to said platen means;
      a second rigid member connected to said carriage means; and
      a third member for coupling said first and second members together, said third member being rigid in one plane and flexible in a direction normal to said one plane;

wherein the movement of said carriage means in said first direction, is rigidly transmitted by said connection to said platen means; and wherein said connection flexibly permits movement of said carriage means in the second direction.

9. The focusing mechanism recited in claim 1, wherein said means for coupling said platen means and said carriage means including a flexure connection, said flexure connection comprising:

a first rigid member connected to said platen means;

a second rigid member connected to said carriage means;

a third member coupled to said first member;

a fourth member coupled to said second member, said third and fourth members being rigid in one plane and flexible in a direction normal to said one plane; and a fifth rigid member connected between said third and fourth members;

wherein the movement of said carriage means in said first direction is rigidly transmitted by said flexure connection to said platen means; and wherein said flexure connection flexibly permits movement of said carriage means in the second direction.

10. The focusing mechanism recited in claim 3, and further comprising:

means for setting up said bearings to ensure precise focus of said scanning line on said media, said setting up means comprising;

first means for adjusting the vertical position of one of said bearings with respect to the other to ensure that the axis between said bearings is parallel to said scanning line; and second means for adjusting the vertical position of said bearings together to ensure precise focus on said media all the way across said scanning line.

11. The focusing mechanism recited in claim 10, wherein said setting up means comprises a platform comprising:

a first arm fixed to said platform on which one of said bearings is rotatably mounted;

a second arm on which the other of said bearings is rotatably mounted;

a first flexure connecting point having one side element mounted to said platform, the other side element being said second arm;

means for precisely moving said second arm about said first flexure point to adjust the vertical position of said other of said bearings with respect to the first of said bearings;

a second flexure point having one side element mounted to the imaging apparatus frame and the other side element mounted to said platform; and means for precisely moving said platform about said second flexure point to adjust together the vertical position of both said bearings with respect to the focused signal scanning line.

12. In a linear imaging apparatus, a mechanism for moving an imaging medium in a first direction while maintaining it in focus in a second direction along a scanned focal line, the mechanism comprising:

a frame;

means for generating a signal beam representing data to be recorded on said imaging media;

means for scanning said signal beam in a single focal line that is positionally fixed relative to the frame;

platen means for holding said media;

carriage means for moving relative to the frame in the first direction;

means for coupling said platen means to said carriage means inflexibly in the first direction and flexibly in the second direction so that movement of said carriage means in the first direction is inflexibly coupled so as to also move said platen means and said media relative to the frame in the first direction while permitting said platen means freedom of movement in the second direction with respect to said carriage means, wherein said coupling means includes a flexure connection which is rigid in the first direction and flexible in the second direction;

drive means coupled between said frame and said carriage means for providing motion to said carriage means relative to said frame in said first direction, said motion being continuous during scanning; and means, operative between the frame and the platen means, for positionally guiding the platen means in the second direction so that said media held by the platen means is positionally maintained in focus in the focal line and along the second direction simultaneously that it is moved by the drive means in the first direction.

13. In a linear imaging apparatus, a mechanism for moving an imaging medium in a first direction while maintaining it in focus in a second direction along a scanned focal line, the mechanism comprising:

a frame;

means for generating a signal beam representing data to be recorded on said imaging media;

means for scanning said signal beam in a single focal line that is positionally fixed relative to the frame;

platen means for holding said media;

carriage means for moving relative to the frame in the first direction;

means for coupling said platen means to said carriage means inflexibly in the first direction and flexibly in the second direction so that movement of said carriage means in the first direction is inflexibly coupled so as to also move said platen means and said media relative to the frame in a first direction perpendicular to said single line while permitting said platen means freedom of movement relative to said carriage means in the second direction;

drive means coupled between said frame and said carriage means for providing motion of said carriage means relative to said frame in said first direction, said motion being continuous during scanning; and guide means, operative between the frame and the platen means, for guiding the platen means in the second direction, during the inflexibly coupled movement of the platen means in the first direction with and by the carriage means as moved by the drive means, so that said media held by the platen means is, as guided along with the platen means in the second direction, maintained in focus in the focal line, said guide means comprising bearings and rails.

14. The focusing mechanism for an imaging apparatus according to claim 13 further comprising:

means for setting up said bearings to ensure precise focus of said focal line on said media, said setting up means comprising precision adjusters in two axes of motion for moving said bearings.

15. A method of focusing a scanning beam at a scanning line on a moveable imaging media, the imaging media being in juxtaposition with a platen that is coupled to a carriage for movement therewith, said method comprising the steps of:

generating a scanning beam containing data to be recorded on the imaging media;

holding the media to the platen;

inflexibly coupling the platen, and the media held to the platen, to the carriage in a first direction that is substantially perpendicular to the scanning line while simultaneously flexibly coupling the platen, and the media held to the platen, to the carriage in a second direction that is substantially along an axis of the scanning beam;

moving during scanning the carriage coupled to the platen in the first direction, therein to inflexibly couple this movement of the carriage in the first direction to the media held to the platen; and guiding, also during the scanning and simultaneously with the moving, the platen in the second direction, this guiding of the platen in the second direction being independent of its motion in the first direction that is provided by the carriage, in order to maintain the media that is held to the platen in focus at the scanning line.

16. The method recited in claim 15, wherein said holding step comprises:

selectively holding by selective application of a vacuum between the media and the platen.

17. The method recited in claim 15 further comprising:

periodically feeding the media by a predetermined distance in a third direction along said scanning line.

18. The method recited in claim 15 wherein said motion step comprises:

reciprocating the carriage by means of a motor and lead screw arrangement.

19. The method recited in claim 15 wherein the moving step comprises:

focusing movement of the carriage coupled to the platen through a flexure connection.

20. The method recited in claim 15 performed on an apparatus including a frame moving a pair of spaced bearings on which similarly spaced rails on the platen ride, said step of guiding the platen in order to maintain the media in focus comprising the steps of:

adjusting the vertical position of one of the bearings with respect to the other to ensure that the axis between the bearings is parallel to the scanning line; and adjusting the vertical position of both bearings together to ensure precise focus of the scanning line on the imaging media.

21. The method recited in claim 15 further comprising:

periodically feeding the media in a third direction substantially along an axis of the scanning line.

22. The focusing mechanism recited in claim 1 further comprising:

means for periodically feeding said media in a third direction substantially along an axis of the focal line by a predetermined distance.

23. The focusing mechanism recited in claim 1 further comprising:

means for selectively enabling and disabling the holding of said media by said platen means.

24. The focusing mechanism recited in claim 2 wherein the focal line is parallel to an axis between said bearings.

25. The focusing mechanism recited in claim 5 wherein the means for selectively holding and releasing said media comprises:

means for applying a vacuum between said media and said platen means selectively during scanning of said media with said signal beam, and for selectively not applying a vacuum during at least some other time periods.

26. The focusing mechanism recited in claim 6 wherein said feed means comprises:

a stepper motor, mounted to the frame, for periodically imparting a drive force; and drive means for coupling the drive force of the stepper motor to the media in order to periodically induce a feed thereof in a third direction substantially along an axis of the focal line.

27. The focusing mechanism recited in claim 7 wherein said reciprocating drive means comprises:

a motor providing a rotational force;

a lead screw rotatably communicating the rotational force from the motor to the carriage means;

wherein the carriage means follows the lead screw rotation to move reciprocally relative to the frame in the first direction.

28. In an imaging apparatus for imaging an energy-sensitive medium while it is maintained in focus to a scanning energy beam, a mechanism for (i) precisely positioning the energy-sensitive medium in a focal line relative to the scanning energy beam, while (ii) moving the medium substantially transversely to the focal line simultaneously that it is precisely positioned, the precision positioning and moving mechanism comprising:

a frame;

a beam means for directionally scanning a focused energy beam in a focal line that is positionally fixed relative to the frame;

a holding means for holding the energy-sensitive medium;

a transport means, operative between the frame and the holding means, for moving the holding means, and the medium held thereon, in a first direction substantially transverse to the focal line, while simultaneously permitting the holding means and the medium held thereon freedom of movement in a second direction substantially along an axis of the scanning energy beam; and a guide means, operative between the frame and the holding means and in the second direction, for positioning the holding means, and the medium held thereon, in the second direction so that the medium is maintained in focus in the focal line of the scanning energy beam, the guide means not interfering with the movement of the holding means and of the medium held thereon in the first direction by action of the transport means;

wherein the holding means is moved in the first direction by the transport means while it is simultaneously positioned in the second direction by the guide means;

wherein the medium is positioned in focus in the focal line by the guide means while it is moved substantially transversely to the focal line by the transport means.

29. The precision positioning and moving mechanism according to claim 28 further comprising:

a means for periodically moving in a third direction, substantially along an axis of the focal line, a new region of the energy-sensitive medium to a position where it is held by the holding means.

30. The precision positioning and moving mechanism according to claim 28 wherein the transport means comprises:
- a carriage means, constrained for movement relative to the frame in the first direction substantially transverse to the scanning energy beam, for holding the holding means, and thereby the energy-sensitive medium that is held by the holding means; and
- linkage means for rigidly affixing the holding means to the carriage means for movement therewith save only that freedom of motion is permitted the holding means, and to the medium held thereon, in the second direction substantially along the axis of the scanning energy beam; and
- a drive means act for moving the carriage, and the holding means affixed thereto by the linkage means, and the energy-sensitive medium that is held by the holding means, in the first direction substantially transverse to the focal line.

31. The precision holding and moving mechanism according to claim 28 wherein the transport means comprises:
- a screw follower; and
- a rotating lead screw rotatably engaging the screw follower so as to move the holding means relative to the frame in the direction substantially transverse to the focal line.

32. The precision holding and moving mechanism according to claim 28 wherein the transport means is moving the holding means and the medium held thereon in the first direction that is substantially transverse to both the focal line and the axis of the scanning energy beam.

33. The precision holding and moving mechanism according to claim 28 wherein the holding means comprises:
- a member having a constant and precise positional relationship to the medium held by the holding means; and wherein the guide means comprises:
- a member contacting the member of the holding means for motion relative thereto;

wherein the contacting members of the holding means and of the guide means positionally fix the medium held by the holding means in focus at the focal line regardless that the holding means, and its held energy-sensitive medium, are moved by the transport means.

34. The precision holding and moving mechanism according to claim 33 wherein one of the members of the holding means and the guide means comprises:
- a rail; and wherein a remaining one of the members of the holding means and the guide means comprises:
- a bearing riding on the rail.

35. In an imaging apparatus for imaging an energy-sensitive medium with a scanning energy beam, a mechanism for positionally maintaining the medium in focus at a focal line of the scanning energy beam regardless that the medium is moved transversely relative to the focal line in order that, by such movement, successive regions of the medium may be imaged by the scanning energy beam, the mechanism comprising:
- a frame;
- scanning energy beam means for scanning an energy beam in a focal line that is positionally fixed relative to the frame;
- a platen means, moveable transversely relative to the focal line and also in the substantial direction of the energy beam, for holding an energy-sensitive media;
- a carriage means engaging the platen means for movement thereof in a direction transversely relative to the focal line, the engaging permitting the platen means a freedom of movement in a substantial direction of the energy beam;
- a drive means for moving the carriage means, and the platen means engaged thereby, in the direction substantially transverse to the focal line so that successive regions of the energy-sensitive media may be imaged by the scanning energy beam;
- a guidance means, operative between the frame and the platen means, for positioning the platen means and the medium held thereon in the substantial direction of the energy beam so that the medium constantly resides in the focal line;

wherein the energy-sensitive medium is maintained in focus at the focal line by the guidance means simultaneously that it is moved transversely to the focal line by the drive means.

* * * * *

UNITED STATES PATENT AND TRADEMARK OFFICE
CERTIFICATE OF CORRECTION

PATENT NO. : 5,095,320
DATED : March 10, 1992
INVENTOR(S) : David M. Rose

It is certified that error appears in the above-identified patent and that said Letters Patent is hereby corrected as shown below:

Column 1, line 44, change "read" to --ready--.

Column 1, line 50, change "no only" to --not only--.

Column 3, line 39, change "linear" to --linescan--.

Column 5, line 19, change "84" to --85--.

Column 6, line 5, change "flexibly" (1st occurrence) to --inflexibly--.

Column 9, line 42, change "focusing" to --forcing--.

Signed and Sealed this

Third Day of August, 1993

Attest:

MICHAEL K. KIRK

Attesting Officer

Acting Commissioner of Patents and Trademarks